Jan. 30, 1968   J. WILLSEA   3,366,207
ELECTROMAGNETIC CLUTCH OR BRAKE
Original Filed July 15, 1963
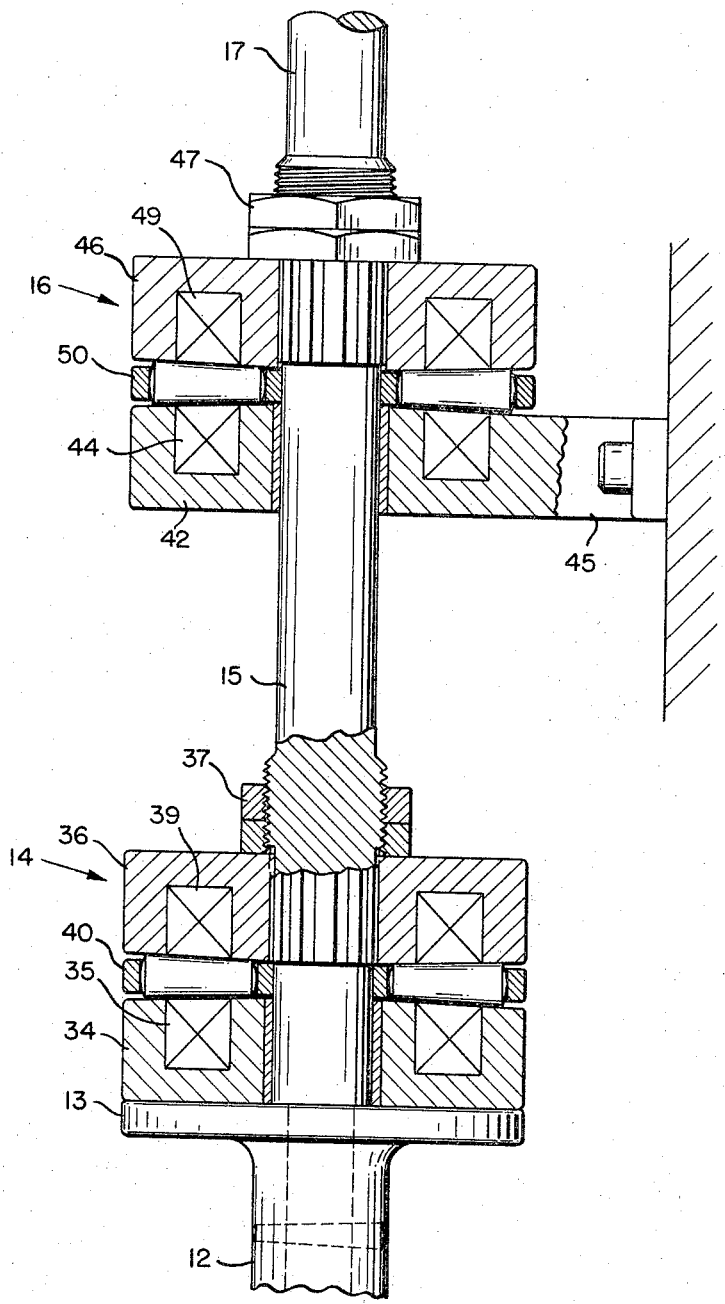
INVENTOR.
JASPER WILLSEA
BY
*Cumpston & Shaw*
ATTORNEYS

# United States Patent Office 3,366,207
Patented Jan. 30, 1968

3,366,207
ELECTROMAGNETIC CLUTCH OR BRAKE
Jasper Willsea, 430 Lake Road, Webster, N.Y. 14580;
Norma J. Willsea, executrix of said Jasper Willsea,
deceased
Original application July 15, 1963, Ser. No. 294,862. Divided and this application Oct. 21, 1966, Ser. No. 591,942.
4 Claims. (Cl. 192—18)

ABSTRACT OF THE DISCLOSURE

A clutch or brake that is entirely electromagnetic. A bearing is transfixed by the maximum magnetism of the common axis of coil ends that are held at each side of the bearing. The coils are held closely near the bearing in the housings that contact the bearing. An adjusting nut provides rolling contact that is maintained even while the bearing is being magnetically transfixed. There is no reluctance nor hysteresis lag from a fluxing of magnetism in massive seizing parts. Nor is there mechanical lag from movement of any seizing parts.

A clutching or braking, therefore, is instant and constant repetitively.

---

This application is a divisional of my copending parent application, Serial No. 294,862 filed July 15, 1963, and now abandoned.

This invention relates to clutches and brakes. More particularly, this invention relates to an electromagnetic clutch and to an electromagnetic brake.

A usual clutch couples a constantly driving shaft to a shaft that is to be driven thereby. Usually it is desirable that a driven shaft should be started gradually into movement. A slippage of the seizing parts of a clutch enables the driven shaft to attain the full speed of the driving shaft by a gradual mechanical seizure.

A mechanical slippage is intentional in a usual clutch, and magnetizing arrangements provide slippage in addition to the mechanical slippage.

A usual electromechanical clutch uses a magnetizing flux to pull the seizing parts together. Reluctance of the magnetizing flux is an additional tendency for a gradual seizure along with the mechanical slippage. This reluctance is produced by a hysteresis from a lagging of the flux because of heat that is generated by the flux. Flux heat varies to affect both hysteresis and a reluctance delay.

Hence, this magnetized slippage is variable in addition to mechanical slippage such as friction and clearance. The total slippage is a product of several variables and difficult to control.

Slippage is desirable in starting and stopping a heavy load. But a movement response in a mechanism under electronic control should also be swift and precise. A delay of the mechanical action in a clutch and a delay in magnetical action from flux reluctance would have to be eliminated to gain swiftness. Any unpredictable delays from mechanical uncertainties and from hysteresis lag would have to be eliminated to gain precision.

In these days of electronic control, a varying delay of an electromechanical clutch or brake becomes noticeable and undesirable where a movement response should be in keeping with a swift and precise control. Launching a space probe rocket is one situation wherein there is a precise interval of time and space relationship for a favorable start of a motion that is calculated to stop when and where desired with a predictable precision, and many other circumstances require predictable precision.

A usual starting and stopping of a movement of a mechanism requires no swiftness nor precision of clutch response. There is only a concern for the interval of a movement without regard to any precise requirement as to when it starts.

Prior art clutches and brakes delay the starting of a movement from the moment the power is switched on to moment of full clutch seizure, and delay approximately the same extent in stopping a movement from the moment the power is switched off to the moment of a full clutch release. The delays of starting and stopping include variations of unpredictable mechanical uncertainties and hysteresis lag that are small compared to the entire delay so that the variations are usually considered negligible and ignored.

But where an instantly immediate response of a movement to a power switch-on is desired, it is further desirable that an instant immediate response should be repeated predictably without variation.

Prior art clutches and brakes are electromechanical in that there is a bearing means that is clamped until mechanically halted by seizing parts that are pulled together by magnetizing flux for a slipping seizure.

An unusual and unobvious breakthrough is to seize the bearing itself magnetically by an arrangement that transfixes it in the full strength of a magnetic axis for a sudden halt that is entirely electromagnetic whereby the bearing is still mechanically free but it is electrically bound.

My seizure is made directly by coils that are arranged in opposing housings with the bearing closely in between the ends of the coils. The magnetic field between the opposing coils transfixes the roller bearing between the housings to resist any relative rotation between the housings and the shafts on which they are secured.

The opposing coils also are opposite in their magnetic polarity and they are positioned as close as possible to the roller bearing for the maximum field strength between the confronting ends of the coils so that the bearing is transfixed by the polar axes of the opposing coils.

The bearing is transfixed in an axis that is common to both coils so that the polar axis of one coil, where extended, would coincide with the polar axis of the other coil.

Referring now in detail to the drawing by numerals of reference, the numeral 12 denotes a constantly driving drive shaft that has a flange 13 mounted on its end. An electromagnetic clutch 14 is mounted on one end of the driven shaft 15, and is abutted against flange 13. An electromagnetic brake 16 is mounted on the driven shaft 15, axially spaced along the shaft from the clutch. The driven shaft 15 has an extension 17 that projects beyond the brake 16 whereby it provides the desired movement.

The electromagnetic clutch 14 comprises a housing 34 that is mounted on the end of the shaft 15, that is abutted against and secured to flange 13, and that contains a coil 35. A second housing 36 is splined on the shaft 15 and is held axially on the shaft 15 by an adjusting nut 37 that is threaded on the shaft. The housing 36 contains a coil 39. A tapered roller bearing 40 is interposed between the housings 34 and 36.

To drive driven shaft 15, the clutch 14 is energized, by energizing the coils 35, 39, in housings 34 and 36 respectively of the clutch 14. The magnetic field generated by the two coils 35 and 39 transfixes the roller bearing assembly 40 and resists any relative rotary movement between the housings 34, 36, and thus between the driving shaft 12 and its flange 13, and the driven shaft 15.

Electric coils 35 and 39, and 44 and 49, can be easily and accurately calibrated so that all the coils in a system can be equilibrated for growth and decay to operate synchronously for a constantly equal effect.

The brake 16 comprises a housing 42 that contains the coil 44 and that is formed with an extension 45 that is anchored to a support, to hold the housing 42 against rotary movement. A second housing 46 is splined on the shaft 15 adjacent the housing 44, and is held against axial movement on the shaft by an adjusting nut 47 that is threaded to the shaft. The housing 46 includes an electromagnetic coil 49. A tapered roller bearing assembly 50 is interposed between the housing 42 and the housing 46.

The drawings show a roller bearing that rolls precisely between the housings and that the precision can be adjusted finely by the adjusting nut. The precision of the rolling contact between the housings is maintained evenly and constantly during the clutching and braking action because the rollers are transfixed in an arrangement whereby the rollers are in the common axis of the magnetic field between the ends of two coils.

The usual electromechanical rollers are clamped to a halt between seizing parts that are pulled together by a magnetic flux in the seizing parts, and without the maximum effect of the axis of the magnetic field between two coil ends.

My housings hold the coils as closely as possible to the rollers for the strongest magnetism, and particularly because an end of each coil confronts the rollers and the end of the confronting coil on the other side of the rollers has the opposite polarity. Hence, the rollers are transfixed in the axis of the magnetic field of both coils at the strongest point in both fields wherein the axes of both coils are common.

A usual electromechanical seizing part is a mass of ferrous material which presents magnetic flux that is far away from poles instead of closely between.

Other features, advantages, and other specific embodiments of this invention will be apparent to those exercising ordinary skill in the pertinent art after considering the foregoing disclosure. In this regard, while specific preferred embodiments of my invention have been described in considerable detail, such disclosure is intended as illustrative, rather than limiting, and other embodiments, variations, and modifications can be effected within the spirit and scope of the invention as disclosed and claimed.

I claim:

1. An electromagnetic clutch for coupling and uncoupling a pair of relatively rotatable shafts, said clutch comprising:
   (a) a first housing on a first one of said shafts;
   (b) a second housing on a second one of said shafts;
   (c) said first and second housings having respective faces confronting each other in uniformly spaced relation;
   (d) said first housing having a first electromagnetic coil coaxial with said first shaft;
   (e) said second housing having a second electromagnetic coil coaxial with said second shaft;
   (f) said first and second coils being arranged to have colinear polar axes;
   (g) means for energizing said coils to produce respectively opposite magnetic poles at said confronting faces;
   (h) bearing means of magnetic material having low flux remanance, said bearing means being interposed between said confronting faces in continuous engagement with each of said faces; and
   (i) each of said coils being disposed close to said bearing means and arranged so that a short, straight flux path of uninterrupted magnetic material is formed through said bearing means between said coils so that when said coils are energized, said bearing means are magnetically transfixed to couple said shafts for rotation together.

2. An electromagnetic clutch according to claim 1 wherein said second housing is splined on said second shaft adjacent said first housing, and an adjusting nut threaded on said second shaft holds said second housing against axial movement on said second shaft.

3. An electromagnetic brake for stopping a relatively rotatable shaft, said brake comprising:
   (a) a first housing anchored to a support;
   (b) a second housing on said shaft;
   (c) said first and second housings having respective faces confronting each other in uniformly spaced relation;
   (d) said first housing having a first electromagnetic coil;
   (e) said second housing having a second electromagnetic coil coaxial with said shaft;
   (f) said first and second coils being arranged to have colinear polar axes;
   (g) means for energizing said coils to produce respective opposite magnetic poles at said confronting faces;
   (h) bearing means of magnetic material having low flux remanance, said bearing means being interposed between said confronting faces in continuous engagement with each of said faces; and
   (i) each of said coils being disposed close to said bearing means and arranged so that a short, straight, flux path of uninterrupted magnetic material is formed through said bearing means between said coils so that when said coils are energized, said bearing means are magnetically transfixed to prevent relative rotation between said housings.

4. An electromagnetic brake according to claim 3 wherein said second housing is splined on said shaft adjacent said first housing, and an adjusting nut threaded on said shaft holds said second housing against axial movement on said shaft.

References Cited

UNITED STATES PATENTS

| | | | |
|---|---|---|---|
| 1,334,759 | 3/1920 | Huebner | 192—40 |
| 2,623,619 | 12/1952 | Clerk | 192—84 X |
| 2,718,292 | 9/1955 | Meilander et al. | 192—84 X |
| 3,034,365 | 5/1962 | Stieber | 192—80 X |
| 3,179,218 | 4/1965 | Burns | 192—84 X |

ROBERT A. O'LEARY, *Primary Examiner.*

ARTHUR T. McKEON, *Examiner.*